US012136182B2

United States Patent
McIntosh

(10) Patent No.: US 12,136,182 B2
(45) Date of Patent: Nov. 5, 2024

(54) METHODS AND APPARATUS FOR MOTION TRANSFER BETWEEN DIFFERENT MEDIA

(71) Applicant: GoPro, Inc., San Mateo, CA (US)

(72) Inventor: Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 357 days.

(21) Appl. No.: 17/662,884

(22) Filed: May 11, 2022

(65) Prior Publication Data

US 2023/0368333 A1     Nov. 16, 2023

(51) Int. Cl.
   *G06K 9/00*    (2022.01)
   *G06T 3/4007*  (2024.01)
   *G06T 5/50*    (2006.01)
   *G06T 7/246*   (2017.01)

(52) U.S. Cl.
   CPC ............ *G06T 3/4007* (2013.01); *G06T 5/50* (2013.01); *G06T 7/248* (2017.01); *G06T 2207/10016* (2013.01); *G06T 2207/20212* (2013.01)

(58) Field of Classification Search
   None
   See application file for complete search history.

(56) References Cited

PUBLICATIONS

Paliwal, Avinash, and Nima Khademi Kalantari. "Deep slow motion video reconstruction with hybrid imaging system." IEEE transactions on pattern analysis and machine intelligence 42.7 (2020): 1557-1569. (Year: 2020).*

Parihar, A. S., et al. "A Comprehensive Survey on Video Frame Interpolation Techniques (2021)." (Year: 2021).*

Paliwal et al., "Deep Slow Motion Video Reconstruction with Hybrid Imaging System", arXiv:2002.12106v2 [cs.CV] Apr. 21, 2020, 12 pages.

Huang et al., "RIFE: Real-Time Intermediate Flow Estimatiyon for Video Frame Interpolation", arXiv:2011.06294v11 [cs.CV] Nov. 17, 2021, 12 pages.

Tulyakov et al., "Time Lens: Event-based Videl Frame Interpolation", CVPR, Narshville, 2021, 14 pages.

* cited by examiner

*Primary Examiner* — Avinash Yentrapati
(74) *Attorney, Agent, or Firm* — Wang Hardoon, P.C.

(57) ABSTRACT

Systems, apparatus, and methods for motion transfer between different media. Two videos shot simultaneously are combined with aspects of each used to produce a higher-resolution frame interpolated video than would otherwise be possible by the devices alone. The interpolated video may be used in slow motion footage, a higher frame rate (e.g., virtual reality) application, or to add a realistic motion blur effect in post-processing (rather than in capture). A post-processing device may receive high-speed video from a high-speed camera and a low-speed video from a low-speed camera. The post-processing device may use motion data from the high-speed video to interpolate frames of (high-resolution) low-speed video producing low-speed interpolated video.

20 Claims, 6 Drawing Sheets

METHODS AND APPARATUS FOR MOTION TRANSFER BETWEEN DIFFERENT MEDIA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital image capture and post-processing. More particularly, the present disclosure relates to systems, computer programs, devices, and methods for motion transfer between different media.

DESCRIPTION OF RELATED TECHNOLOGY

Frame interpolation (also known as motion interpolation) is a video processing technique in which intermediate frames are generated between captured frames to make the movement in a frame more fluid, to compensate for motion blur, or to create a slow-motion effect. Such techniques may be used to capture and playback content at different frame rates. Frame interpolation generates intermediate frames by inferring object motion from consecutive key-frames.

Consumers, and in particular "pro-sumers," want the ability to generate slow-motion (frame interpolated) video using a "beauty camera." Notably, beauty camera settings are often unable to provide the desired exposure in combination with the desired capture frame rate—e.g., capturing video of a hummingbird flapping its wings with typical cinematic settings (e.g., 24 FPS and a 180° shutter angle) will not provide an aesthetically pleasing motion blur. Nonetheless, a prosumer may want to emulate the "look-and-feel" of a cinema style-shutter angle—but at a much higher shutter speed.

Action cameras are a relatively recent phenomenon. Unlike traditional photography, action cameras are typically designed to capture immersive footage. For a variety of reasons, action cameras are typically compact, ruggedized, and designed to require minimal interaction once recording has begun. In most situations, the action camera user cannot control shooting conditions; interesting moments fleetingly occur and often cannot be replicated. As a result, content generated by action cameras often requires significant editing; a lot of raw footage may be uninteresting (e.g., the user may be waiting for action to happen), and shots may need to be re-framed (e.g., were captured off-center, etc.).

While there are important differences between traditional and action camera footage, ultimately consumers want the ability to blend together the best features of both.

DETAILED DESCRIPTION

Figure 1:
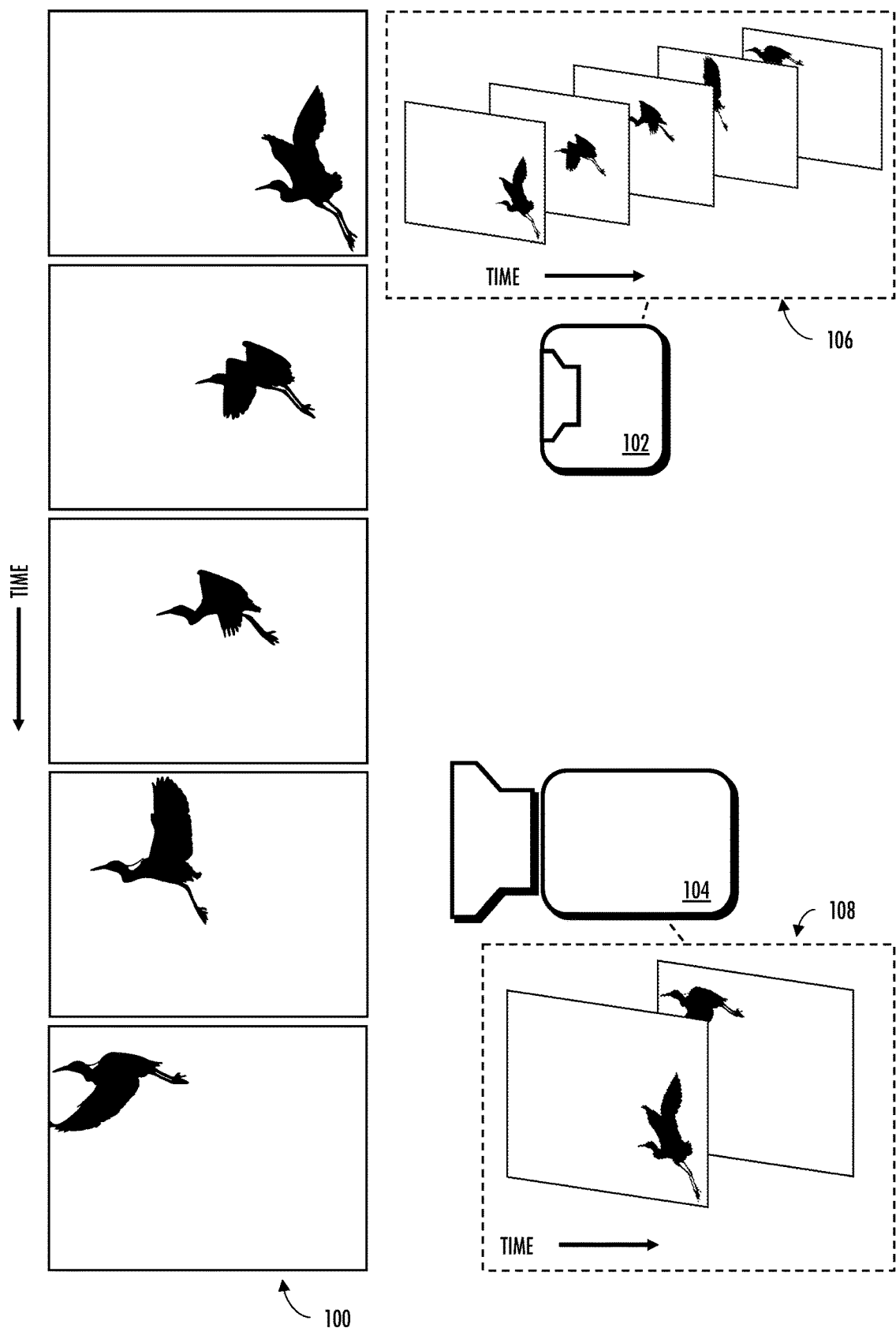
FIG. 1 is a graphical representation of two cameras capturing video of a scene, useful to illustrate various aspects of the present disclosure.

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Frame Interpolation and Event Cameras

Frame interpolation techniques use existing frames of video to generate so-called "intermediate" frames. The newly created frames may be interspersed between the existing frames as to change the video playback. As one such example, so-called linear frame interpolation linearly averages frames to create intermediate frames. Linear interpolation techniques can be implemented with low computational complexity making it suitable for e.g., mobile applications. Unfortunately, non-linear motion between frames (e.g., where the camera itself moves, where an object is hidden/uncovered, etc.) may introduce visual anomalies and glitches.

Recent research has used neural network processing in combination with event cameras to address non-linear motion for frame interpolation. In one specific implementation, footage may be captured with a combination of a traditional image sensor camera and a high-speed event camera. Such implementations have found some success in re-constructing intermediate/interpolated frames with neural networks/artificial intelligence.

As a brief tangent, an event camera is a type of camera with an imaging sensor that responds to local changes in brightness. Event camera pixels independently respond to changes in brightness as they occur. Each pixel stores a reference brightness level, and continuously compares it to the current brightness level. If the difference in brightness exceeds a threshold, that pixel resets its reference level and generates an "event"; i.e., a discrete packet that contains the pixel address and timestamp. Events may also contain the polarity (increase or decrease) of a brightness change, or an instantaneous measurement of the illumination level. Thus, event cameras output an asynchronous stream of events triggered by changes in scene illumination.

Notably, each pixel inside an event camera independently and asynchronously reports changes in brightness as they occur but stays silent otherwise. While the output of an event camera is not a usable image (i.e., one intended for human viewing), the event reporting system enables microsecond temporal resolution, very large dynamic ranges (120 dB), and more robust light detection over a range of conditions compared to traditional image sensors (e.g., under/overexposure and motion blur). Because individual pixels fire independently, event cameras are also particularly well suited for integration with asynchronous computing architectures such as neuromorphic computing.

Unfortunately, while neural network processing techniques may have promise in non-linear frame interpolation, event cameras are expensive and specialized devices that are not commonly used-by/sold-to consumers. Furthermore, these techniques are substantially more complex than linear frame interpolation and are not well suited for embedded devices which often must work with limited resources (small batteries, limited memory space, fixed bandwidth, and/or compute resources).

Exemplary Dual-Capture System

Conceptually, non-linear motion between frames occurs where the frame rate is not fast enough to capture the subject-of-interest's motion. In other words, non-linear motion is a sampling problem. Ideally, the pro-sumer may want their camera to shoot according to its desired capture settings (e.g., ISO, shutter speed, and f/stop) to capture a desired aesthetic look, but also provide sufficient information to interpolate frames for the desired playback rate. Notably, "smooth" or "cinematic" footage is typically shot with shutter speeds that are twice (2×) as fast as the frame rate; higher ratios (e.g., 4×, 8×) will result in a "staccato" or "newsreel" aesthetic. As a practical matter, this may not be possible for a single camera sensor—e.g., the desired capture settings conflict with very high shutter speeds and vice versa.

FIG. 1 is a graphical representation of two cameras capturing video of a scene, useful to illustrate aspects of the present disclosure.

As shown, cameras 102 and 104 capture a scene 100 of a bird taking off and flying. High-speed camera 102 captures high-speed video 106 at a high frame rate (e.g., 240 FPS) and low-speed camera 104 captures low-speed video 108 at a low-frame rate (e.g., 24 FPS). High-speed camera 102 may capture the high frame rate high-speed video 106 sufficient to provide pixel motion information for frame interpolation e.g., capture the image detail in the quick flapping of the bird's wings. In some examples, high-speed camera 102 may sacrifice image resolution for the high capture rate e.g., due to bandwidth/processing limitations, etc. For example, the device may limit the capture of video at 240 FPS to HD or lower resolution. Low-speed camera 104 may elect for a high-quality (e.g., larger resolution, greater color depth, etc.) video for larger resolution playback.

When played back in slow motion (i.e., at a slower playback frame rate than the capture frame rate), the high-speed video 106 will convey smoothly animated motion, but may have less motion blur than desired, resulting in an unnatural/un-cinematic aesthetic.

Directly re-playing the low-speed video 108 in slow motion will produce a choppily animated motion (with the desired motion blur) since each captured frame is played for a disproportionate length relative to the captured motion. More directly, in this case, the bird's wings are only captured in the fully raised, and fully lowered positions. To correct this, some video editors/players/displays interpolate frames between the captured frames to reduce the choppiness of the playback. The interpolated footage, however, may simply be a linear blend of the adjacent frames. In this example, the fast and complex motion of the bird's movement were not captured by low-speed camera 104 in any of the captured frames of low-speed video 108. Thus, the interpolated footage would only "blur" between one another (rather than conveying the non-linear/complex motion of the bird). As previously noted, more esoteric interpolation techniques may use artificial intelligence or neural network processing on the low-speed video 108 to predict interpolated frames. Such techniques are also unable to accurately predict with non-linear motion with accuracy. All existing frame interpolation techniques introduce perceptible ghosting, blurriness, holes, and other artifacts in the interpolation.

One exemplary embodiment of the present disclosure utilizes a dual-capture system with image processing to enable frame interpolation. A first "beauty camera" captures footage according to its desired capture settings, a second "piggyback camera" can be configured to capture pixel motion information. Subsequent image processing transfers the motion vectors from the piggyback camera to the beauty footage, along with other image manipulations (e.g., cross-fading) to create intermediate frames. In other words, the videos are shot simultaneously and combined to produce a higher-resolution frame interpolated video than would otherwise be possible by either device alone.

Figure 2:
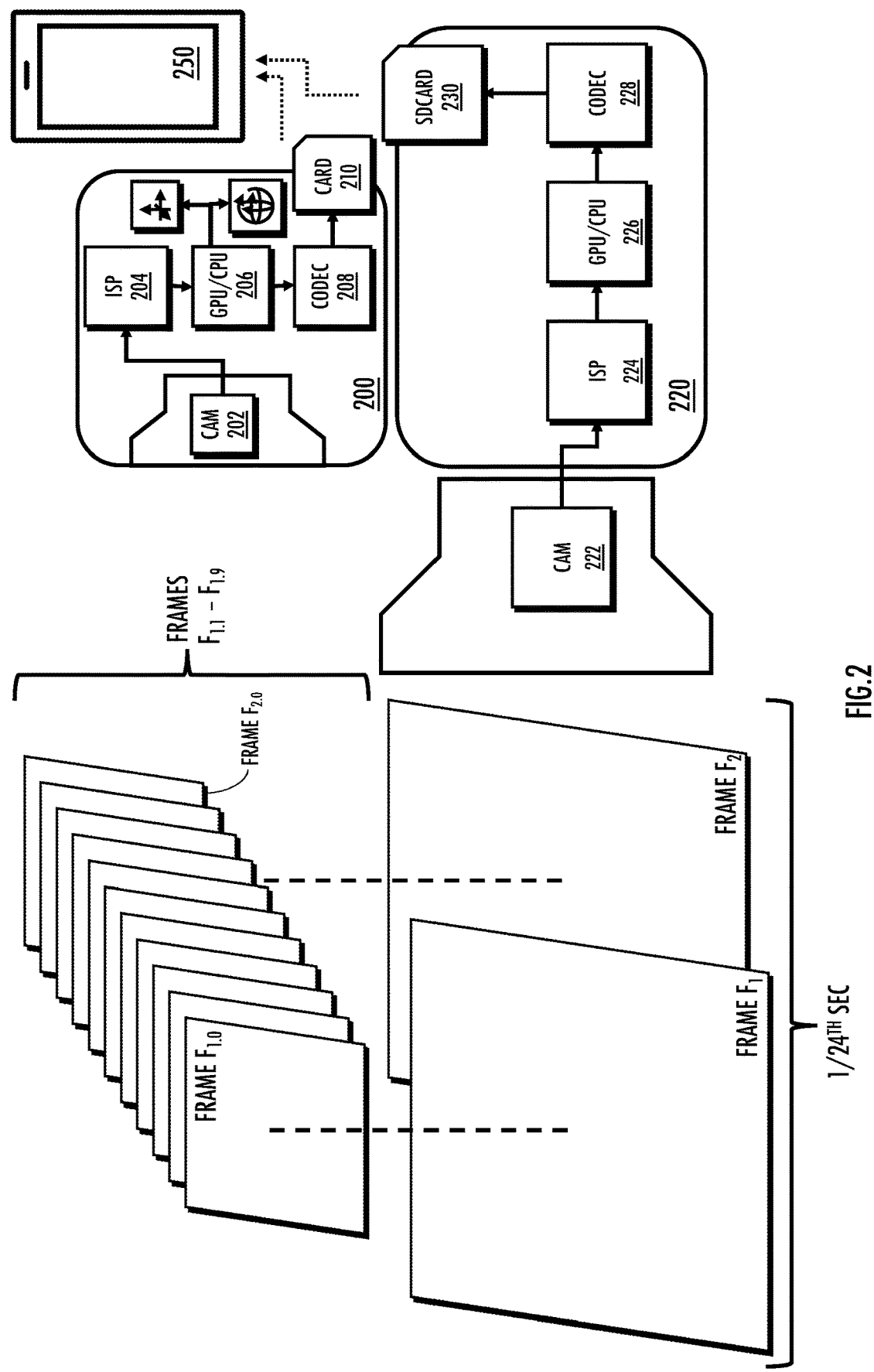
FIG. 2 is a graphical representation of a "piggybacking" camera configuration, useful to illustrate various aspects of the present disclosure.

FIG. 2 is a graphical representation of a "piggybacking" camera configuration, useful to illustrate various aspects of the present disclosure. The system includes a low-speed high-resolution ("beauty") camera 220 that is configured to capture higher-resolution frames at a slower frame rate, and a high-speed low-resolution camera 200 that is configured to capture lower-resolution frames at a faster frame rate. For example, the low-speed camera may capture a scene in 4K resolution (3840 pixels×2160 pixels) at 24 frames/second and the high-speed camera captures the scene at full HD resolution (1920 pixels×1080 pixels) at 240 frames/second.

In one exemplary variant, a post-processing device 250 may receive high-speed video from high-speed camera 200 and low-speed video from low-speed camera 220 via wireless connectivity or media (e.g., SD card 210, SD card 230). The post-processing device 250 may use motion vectors from the high-speed video to create intermediate frames of (high-resolution) low-speed video. The resulting low-speed interpolated video 280 may be used in slow motion footage for playback at a higher frame rate (e.g., photorealistic applications) or to add a realistic motion blur effect in post-processing (rather than with capture settings).

In the illustrated embodiment, the low-speed camera 220 includes: a camera sensor 222, an ISP 224, a processing system 226, a codec 228, and removable storage media 230. In some embodiments, low-speed camera 220 includes an accelerometer, a gyroscope, and/or other motion sensors. In some embodiments, low-speed camera 220 includes one or more microphone(s) to capture audio.

In the illustrated embodiment, the low-speed camera is a digital single-lens reflex (DSLR) camera. Other implementations may use a mirrorless camera, a point-and-shoot camera, a digital camcorder, or any other presentation resolution capture device. The low-speed camera may be used as the basis resolution of the frames of the final interpolated video. Such captures may therefore maximize resolution (e.g., size, number of pixels) and image quality (e.g., pixel depth, color quality, etc.).

In the illustrated embodiment, the high-speed camera 200 includes: a camera sensor 202, an image signal processor (ISP) 204, a processing system 206, a codec 208, and removable storage media 210. In some embodiments, high-speed camera 200 includes an accelerometer, a gyroscope, and/or other motion sensors. In some embodiments, high-speed camera 200 includes one or more microphone(s) to capture audio.

In the illustrated embodiment, the high-speed camera may be an action camera that can capture video data. Other embodiments of high-speed cameras may include without limitation a cellular/smart phone, a tablet camera, a laptop (with a webcam), an aerial drone, security cameras, self-driving cars, smart appliances and/or industrial automation, and/or any other source of pixel motion vector data.

While the foregoing discussion is presented in the context of a higher-resolution and a lower-resolution camera, the techniques described throughout may be used with same resolution cameras (e.g., two action cameras, two SLRs, two camera-phones, etc.) that may be configured at different resolutions and capture speeds. In still other examples, one camera may have both the highest-resolution and highest capture speed (but not at the same time); in such cases, the more capable camera may be used as the high-speed camera due to its high-speed capabilities, while the other camera is used as the low-speed "beauty camera". More generally, the techniques described herein may be used in any scenario where multiple cameras provide different complementary parameters—for example, a three-camera system may use a high-speed/low-resolution, mid-speed/mid-resolution, low-speed/high-resolution cameras, etc.

In one exemplary embodiment, the high-speed camera 200 may be mounted on the low-speed camera 220 via a standard accessory mounting point (e.g., a hot/cold shoe). For example, one camera (e.g., high-speed camera 200 may be placed in a housing or an accessory attached to a tripod or underside accessory port with an accessory "cold shoe" attachment for connection to another device. In a further embodiment, the attachment may be a "hot shoe" connection and the cameras may be in electronic signal communication for, e.g., ease of video synchronization, camera/exposure settings setup, etc.

In rudimentary embodiments, the low-speed camera 220 and the high-speed camera 200 may be held together temporarily by hand or by placing each camera on adjacent tripods. The low-speed camera 220 and the high-speed camera 200 may also be linked via a dual camera tripod mount. Still other linkage mechanisms may include e.g., specially designed rigs, fasteners (e.g., screws, nuts/bolts, nails), dollies, double-sided tape/adhesive, cording/bands, and/or any other physical linkage.

In some embodiments, the high-speed camera 200 and the low-speed camera 220 are rigidly affixed. As used herein, the terms "rigid", "rigidly affixed", and their derivatives, refer to a physical arrangement of components that does not deform during mechanical stresses (e.g., rotation, translation, etc.) for their intended operation. In other words, the high-speed camera 200 and the low-speed camera 220 are physically coupled such that the rotations, translations, and/or other mechanical perturbations experienced by the high-speed camera 200 are mechanically transferred to the low-speed camera 220 and vice versa.

In some variants, telemetry data captured on one camera, e.g., high-speed camera 200, may be transferred to and used by the other camera, e.g., low-speed camera 220. Use of telemetry data from one device by another camera device is more broadly described within co-owned U.S. Provisional Patent Application No. 63/267,292 entitled "SYSTEMS, APPARATUS, AND METHODS FOR ENCODING TELEMETRY DATA AS AUDIO WAVEFORMS" filed Jan. 28, 2022, incorporated herein by reference in its entirety.

As used herein, a "frame" is one of many still images which compose a complete video. In some embodiments, videos may be encoded with multiple frame types. For example, a video may be represented with intra-frames (I-frames), predicted frames (P-frames), and bi-directional frames (B-frames). I-frames are compressed with only intra-frame similarity. Every macroblock in an I-frame only refers to other macroblocks within the same frame. In other words, an I-frame can only use "spatial redundancies" in the frame for compression. Spatial redundancy refers to similarities between the pixels of a single frame. P-frames allows macroblocks to be compressed using temporal prediction in addition to spatial prediction. For motion estimation, P-frames use frames that have been previously encoded. Every macroblock in a P-frame can be temporally predicted, spatially predicted, or "skipped" (i.e., the co-located block has a zero-magnitude motion vector). Images often retain much of their pixel information between different frames, so P-frames are generally much smaller than I-frames but can be reconstructed into a full frame of video. B-frames use temporal similarity for compression—however, B-frames can use backward prediction (a look-backward) to compress similarities for frames that occur in the future, and forward prediction (a look-ahead) to compress similarities from frames that occurred in the past. Notably, while some cameras/encoders may encode certain frames with differences between frames (e.g., P- and B-frames) or even entirely skipped frames, the high-speed camera 200 and the low-speed camera 220 capture each frame at a constant frame rate i.e., a regular (consistent) timing scheme.

Figure 3:
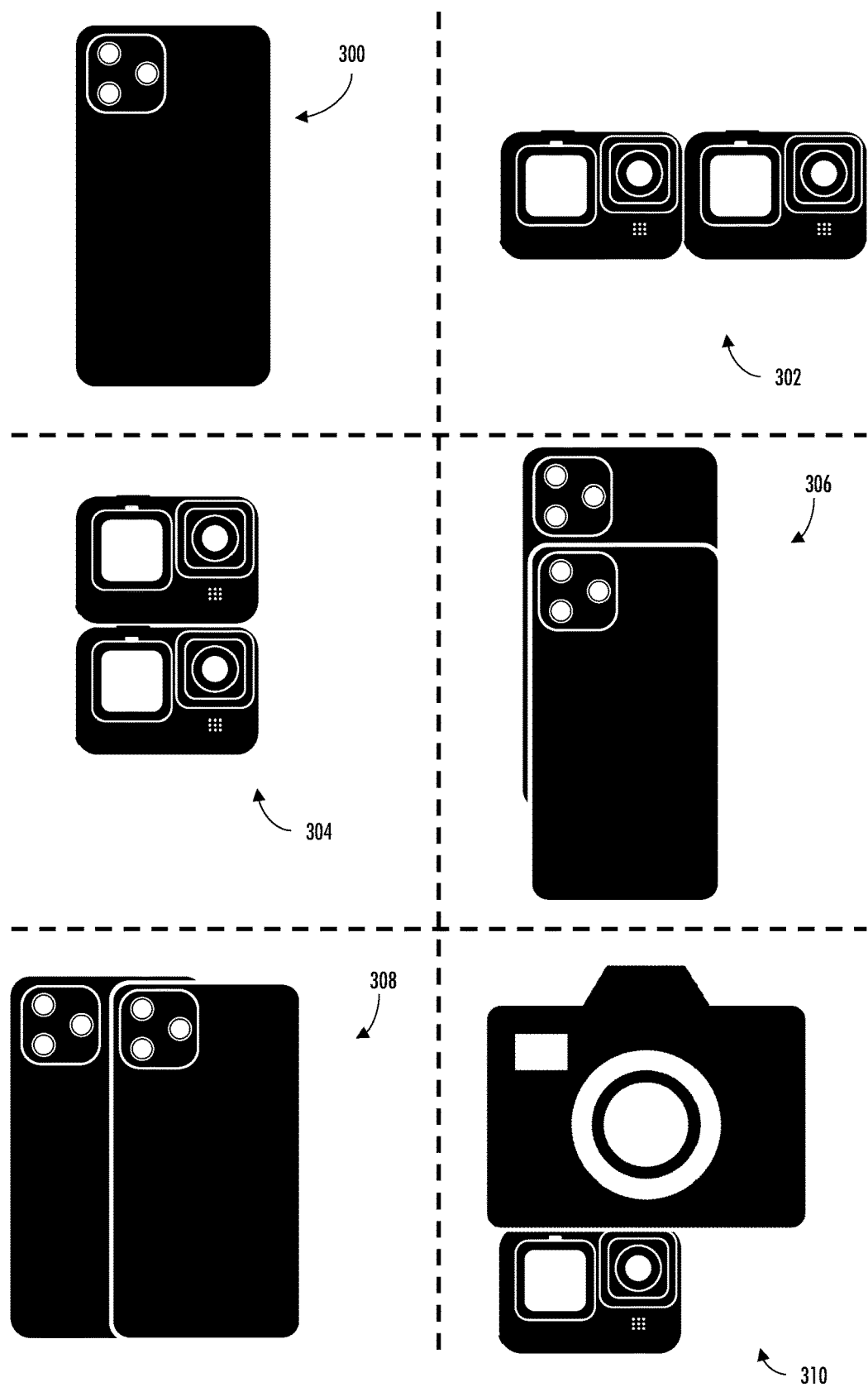
FIG. 3 is a graphical representation of different piggybacking systems, useful for illustrating various aspects of the present disclosure.

FIG. 3 is a graphical representation of different piggy-backing systems, useful for illustrating various aspects of the present disclosure. Camera system 300 is a multi-camera system within a single fixed housing (such as a smart phone), that may be configured to capture video frames at different frame rates. As shown, the lenses/sensors may have a fixed arrangement which may aid in calculating an offset (or transforming data) between frames captured by any of the cameras. In some embodiments, the lenses/sensors of each camera may have different characteristics that may be used to select the high-speed/low-speed cameras. For example, based on the user's intended shot (wide, normal, macro), one lens/sensor may be configured as the low-speed high resolution camera and a different lens/sensor may be used as the high-speed low resolution camera, etc. In other embodiments (not shown), the lenses/sensors of each camera may be the same or have similar characteristics (e.g., focal distance, sensor resolution).

Camera system 302 is a multi-camera system using two action cameras set horizontally adjacent to each other. Likewise, such cameras may be set vertically adjacent as shown in camera system 304. Similar systems can be created from smart phones (camera system 306 illustrates a vertical smart phone alignment, whereas camera system 308 illustrates a horizontal alignment). In such cases, each device of the system may be configured to use the same lens/sensor (e.g., wide, normal, macro) to simplify subsequent comparisons between footage. Alternatively, different devices may be configured to use different lens/sensors to provide different vantages of the same subject.

Camera system 310 illustrates a mixed-device camera system. In camera system 310, an action camera may capture high-speed video while a DSLR may capture low-speed video. In other systems (not shown), a smart phone may capture high-speed video while an action camera or DSLR may capture low-speed video. Alternatively, a smart phone may be configured to capture the low-speed video and the DSLR/action camera may capture high-speed video, e.g., due to better low-light performance of the sensors of the DSLR/action camera as compared to the smart phone.

Referring back to FIG. 2, one illustrative use scenario is described in greater detail. During exemplary operation, frames $F_1$ and $F_2$ are captured by low-speed camera 220 (e.g., at 24 frames per second (FPS)). Frames $F_{1.0}$-$F_{2.0}$ may be captured by high-speed camera 200 at 240 FPS. Frames $F_1$ and $F_2$ correspond to frames $F_{1.0}$ and $F_{2.0}$ captured by high-speed camera 200. Notably, intervening/intermediate frames $F_{1.1}$-$F_{1.9}$ at 240 FPS do not have corresponding frames caught by the low-speed camera 220. According to embodiments of the present disclosure, data (e.g., motion vectors, color data, perspective data) from these intervening/intermediate frames $F_{1.1}$-$F_{1.9}$ may be used to augment the higher resolution frames $F_1$ and $F_2$ for various use cases including frame interpolation, HDR, depth estimation, novel view synthesis, and structure-from-motion/3D reconstruction.

Within the context of frame sequences, the term "correspond" and its linguistic derivatives identify those frames that were captured by different devices and/or lens/sensor assemblies (e.g., high-speed camera 200 and low-speed camera 220) at the same or substantially the same time. Frames with substantially the same capture time refer to (1) frames that were caught within the time period of a single frame (e.g., $\frac{1}{24}^{th}$ of a second in 24 FPS video) of one of the captured videos (e.g., the lower FPS video) and/or (2) a frame of the faster captured video that is closest in capture time to the frame of the slower capture video. In some embodiments, corresponding frames may be used to synchronize video from frames captured by the high-speed camera 200 and the low-speed camera 220. In other embodiments, synchronized video may be used to determine frame correspondence.

As shown in FIG. 2, the high-speed camera's high frame rate capture may be used to provide motion vector information in the "blind-time" between frames captured by the low-speed camera. For example, frame $F_1$ captured by the low-speed camera 220 substantially corresponds to the same time of the capture of frame $F_{1.0}$ of the high-speed camera 200 and the frames may be (roughly) synchronized. Frame $F_2$, captured by the low-speed camera 220, substantially corresponds to the same time of capture as frame $F_{2.0}$ of the high-speed camera 200 and the frames may be (substantially) synchronized. Frames $F_{1.1}$—$F_{1.9}$, captured by the high-speed camera 200, do not correspond in time to any frames captured by the low-speed camera 220. The motion information (between frame $F_{1.0}$ and frame $F_{1.1}$, frame $F_{1.1}$ and frame $F_{1.2}$, etc.) may be used to generate motion vectors that can be used to manipulate pixels in the low-speed frames $F_1$ and $F_2$ to generate better quality intermediate frames.

Figure 4:
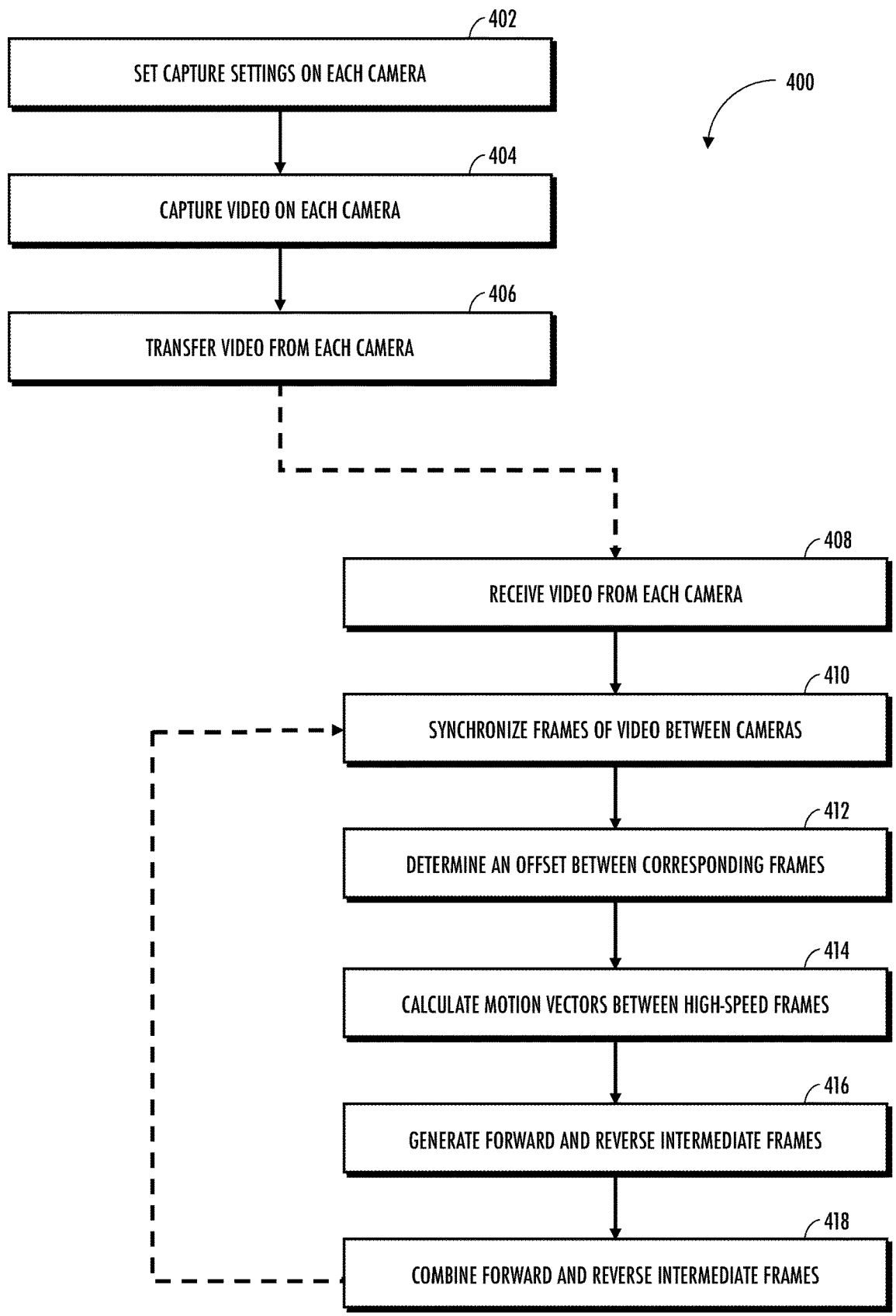
FIG. 4 illustrates an exemplary logical flow diagram for motion transfer between different media, according to aspects of the present disclosure.

FIG. 4 illustrates an exemplary logical flow diagram according to aspects of the present disclosure. Certain steps (e.g., steps 402-406) of method 400 may be performed by a single combined camera device (e.g., smart phone camera system 300) or performed by a plurality of camera devices (e.g., high-speed camera 200 and low-speed camera 220). Other steps (e.g., steps 408-418) may be performed by processing systems on one or more camera or a separate post-processing device 250.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for $\frac{1}{24}$th of a second. Similarly, 120 FPS using a 360° shutter angle exposes the photosensitive sensor $\frac{1}{120}$th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $\frac{1}{48}^{th}$ of a second at 24 FPS. Some users may use other shutter angles that mimic old 1950's newsreels (shorter than 180°).

Referring back to FIG. 4, capture settings for each camera are set. In one exemplary embodiment, a first camera may be set for high-speed capture (high-speed camera 200) and a second camera may be set for high-resolution capture (low-speed camera 220). Shutter speed, ISO, and aperture may be automatically (or manually, where desired) selected for a given exposure based on a desired frame rate and/or shutter angle.

As but one such example, the selected capture FPS may be based on device requirements. For example, low-speed camera 220 may allow a user to capture 4K/Ultra High Definition (UHD) video (3,840×2,160) video at up to 30 FPS and Full High Definition (HD) video (1,920×1,080) at up to 60 FPS. The high-speed camera 200 may allow a user to capture 5.3K-wide field-of-view video (5312×2988) at up to 60 FPS, 4K video at up to 120 FPS, a 2.7K (2704×1520) video at 240K, and a Full HD video at up to 240 FPS. The capture settings of the low-speed camera 220 may be selected to maximize/prioritize picture quality/resolution. In the provided example, 4K/UHD capture may be selected at 24 FPS on the low-speed camera 220. Capture settings of the high-speed camera 200 may be selected to maximize/prioritize capture frame rate. In the provided example, 2.7K or full HD modes may be selected at 240 FPS. Other settings may be selected based on one or more of: final video resolution, the high-speed capture rate, additional resolution/color detail in the captured (high- or low-speed) video, etc.

In some variants, exposures may be set differently between cameras to achieve an HDR-like effect in post processing. For example, one camera (e.g., the high-speed camera 200) may shoot with exposure settings to capture slightly underexposed images (e.g., −2 stops). The other camera (e.g., the low-speed camera 220) may shoot with exposure settings to capture the "proper" exposure or possibly even a slightly overexposed image (e.g., +0 or +2 stops). The tones from the respective images may be mapped and additional information that was "blown out" (e.g., captured as a maximum, pure white, or minimum, pure black, value) in the "proper" exposure can be added back in during post-processing, to produce a high dynamic range (HDR)-like effect in the video (e.g., +2 EV/−2 EV HDR). These techniques may be extended to 3-shot and higher HDR photography as well (e.g., +2/0/−2, etc.)

In some embodiments, the high-speed camera 200 and low-speed camera 220 may be placed in a common housing (e.g., a shared mount), on one or more tripods, or attached together for stereo-video capture. Further, the high-speed camera 200 and the low-speed camera 220 may be synchronized by a common hardware or software trigger (to begin video capture). In other embodiments, the high-speed camera 200 and the low-speed camera 220 may be time synchronized for timestamp/metadata capture.

At step 404, a common scene may be captured simultaneously by the cameras. Each video may be captured using the pre-selected settings (e.g., those determined in step 402); e.g., a high-speed video is captured by the high-speed camera and a low-speed video is captured by the low-speed camera. Each captured video may be processed by a processing pipeline of the respective cameras. For example, video that is captured by camera sensor 202 of high-speed camera 200 may be processed by, inter alia, the ISP 204, the processing system 206, and the codec 208 before storage on the removable storage media 210. Video captured by camera sensor 222 of low-speed camera 220 may be processed by, inter alia, the ISP 224, the processing system 226, and the codec 228 before storage on the removable storage media 230. In other embodiments, raw sensor data from camera sensor 202 of high-speed camera 200 and/or camera sensor 222 of low-speed camera 220 may be saved to the removable storage media 210 and the removable storage media 230.

At step 406, the stored video may be transferred for frame interpolation processing (e.g., motion transfer, stabilization, color correction, structure-from-motion detection, described hereinafter). In the system of FIG. 2, captured video from the high-speed camera 200 and/or the low-speed camera 220 may be transferred to the post-processing device 250. Alternatively, if a camera is itself capable of post-processing, the post-processing camera may obtain the other video from the other camera.

The post-processing device 250 may receive videos from a plurality of cameras at step 408. In some implementations, videos captured by the high-speed camera 200 and the low-speed camera 220 may be received as separate video files. In other examples, the videos may be encapsulated within the same video file as separate tracks. In some embodiments, the video may be obtained via a removable storage media 210 and 230. In other embodiments, both high-speed video and low-speed video may be obtained via a (shared) removable memory card. More generally, the video may be transferred to the post-processing device 250 via any data/network interface. For instance, video from multiple cameras may be gathered by e.g., an internet server, a smartphone, a home computer, etc. and then transferred to the post-processing device 250 via either wired or wireless transfer.

The post-processing device 250 may parse the received video files for motion transfer. The post-processing device 250 may obtain frame $F_1$ and $F_2$ from the low-speed camera 220 footage and frames $F_{1.0}$, $F_{1.1}$, $F_{1.2}$, $F_{1.3}$ . . . $F_{2.0}$ of high-speed camera 200 footage. In some implementations (e.g., HDR variants), the frame may be characterized by a different exposure settings. In yet other implementations, the post-processing device 250 may only parse, pre-parse, or receive reduced resolution images to provide preview processing (e.g., reduced resolutions may be useful for handling more high-speed frames in the same memory or providing rough edits on high-resolution frames).

The post-processing device 250 may synchronize frames of the received video (step 410). For example, the post-processing device 250 may match frame $F_1$ of the low-speed camera 220 and $F_{1.0}$ of the high-speed camera 200 and frame $F_2$ of the low-speed camera 220 and frame $F_{2.0}$ of the high-speed camera 200.

In some embodiments, camera timing may have been synchronized prior to video capture, and the frames may be synchronized based on metadata within the video track, e.g., timestamp data. In some variants, time alignment may be searched within a window interval. For example, capture times may be compared between the captured videos/tracks; a set of frames around the closest matching timestamps can be compared (using image analysis) to find the best alignment of frames that were captured at the same time or substantially the same time. In such cases, image analysis techniques may attempt to compare (via minimum squared error or similar metric) pixels between frames to synchronize frames captured by the high-speed camera 200 and the low-speed camera 220.

In other embodiments, visual cues may be used to time align footage. For example, a slate/clap board clapping closed that is captured in both videos may be used to synchronize frames of video. In still other embodiments, videos may be searched based on the beginning of the videos (e.g., assuming the videos are pre-synchronized). In yet other common usage scenarios, a user may manually set the search window. For example, a user may only want to post-process a short portion of the captured video for slow motion replay; in this case, a shorter track only needs to be aligned within a small window of a longer track timeline.

In some embodiments, frames may be synchronized based on metadata, including captured telemetry data, audio (or scratch audio) data, and/or pixel movement between frames. As but one example, the high-speed camera 200 and the low-speed camera 220 may each capture contemporaneous audio. Frames may be aligned based on matching audio levels (e.g., a spike in loud noise from the scene or a clapper used for audio synchronization). Additionally, frames may be aligned between videos based on device movement data. For example, where the high-speed camera 200 and the low-speed camera 220 are rigidly connected and both devices capture motion data (e.g., acceleration with an accelerometer, angular velocity with a gyroscope) such motion data may be compared and used to align frames based on the recorded motion.

The post-processing device 250 may calculate an offset between frames, at step 412. These offsets ("spatial offsets") reflect the spatial differences in pixels between the high-speed camera 200 and the low-speed camera 220.

In one such implementation, post-processing device 250 determines an offset for each set of corresponding frames (e.g., a first offset with the differences between frame $F_1$ and frame $F_{1.0}$; a second offset with the differences between frame $F_2$ and frame $F_{2.0}$). In some implementations, multiple offsets may be calculated for each frame; for example, a global offset may be applied to the entire frame and local offsets may be used for smaller portions of the frame (e.g., per pixel or group of pixels). More generally, offsets may represent any spatial shift of pixels/groups of pixels (e.g., blocks). Other examples may represent the differing movement of pixels/groups of pixels based on the different positions of the cameras and/or the lens/camera geometries capturing and distorting the light. As but one such example, the offsets may be determined after re-projecting each frame to compensate for lens geometry differences. In still other examples, the offsets include an angular shift to describe different angular motions of the cameras (often represented by a quaternion). Still other hybrids and/or combinations of the foregoing may be substituted with equal success.

As the lenses and sensors of the cameras may not be the same, the resulting images may have different lens distortions. Further, a parallax effect may be introduced by differences in shooting perspective providing further distortion/differences between corresponding frames (e.g., frame $F_1$ and $F_{1.0}$, and frame $F_2$ and $F_{2.0}$). Additionally, each camera may have slight differences in timing, and may capture frames at slightly different capture times (i.e., the frames may not be exactly time-aligned) which may create further differences. One or more offsets may be calculated that is based on the different lens polynomial, parallax, and/or timing effects. These offsets may be static between video frames (a single offset to represent differences between corresponding frames in an entire video) or may be calculated on a corresponding-frame-by-corresponding-frame basis (e.g., a first offset between frame $F_1$ and $F_{1.0}$ and a second between frame $F_2$ and $F_{2.0}$).

In one such variant, different calculated offsets may be applied to counteract different effects (e.g., one offset for the lens polynomial differences, one offset for parallax effects, another offset to correct timing between corresponding frames). Some of these offsets may be applied globally (e.g., to an entire video) and others locally (on a frame-by-frame basis). For example, so-called "point-and-shoot" digital cameras have a field-of-view of approximately 60°; digital single-lens reflex (DSLR) cameras can be used with lens attachments that change the field-of-view (typically in the range of 30° to 90°; action cameras can have an ultra-wide 90°+field-of-view. Comparing the lens differences across just the overlapping field-of-view may be more easily achieved by using lens offset values.

Referring back to FIG. 4, the post-processing device 250 may calculate motion vectors between high-speed frames (step 414). These motion vectors reflect the temporal differences in pixels between frames of the high-speed camera 200. Various techniques may be used to determine motion vectors between frames. In one such example, optical flow is used to determine motion vectors for each frame of high-speed video. The result of the optical flow analysis is a set of motion vectors between frames. The output may include a per-pixel, per-block, or per-feature map of movement between frames.

At step 416, the post-processing device 250 may generate a series of intermediate frames. The intermediate frames are generated by applying the motion vectors (determined at step 414) and the spatial offsets (determined at step 412) to the low-speed frames (e.g., $F_1$ and $F_2$) captured by low-speed camera 220. In one such implementation, each spatial offset (e.g., the first spatial offset between $F_1$ and $F_{1.0}$, and second spatial offset between $F_2$ and $F_{2.0}$) are combined with the motion vectors to create two sets of combined motion vectors that can be applied to the low-speed frames to create two video streams: a forward-extrapolated video and a reverse-extrapolated video.

As used herein, the term "interpolate" and its linguistic derivatives refer to techniques that approximate unknown intermediate data between known data points. In contrast, the term "extrapolate" and its linguistic derivatives refer to techniques that approximate unknown data by extending from known data. In one exemplary embodiment, the post-processing device 250 extrapolates two separate (high-resolution) low-speed video segments: a forward-extrapolated video with frames $F'_{1.1}$-$F'_{1.9}$ based on $F_1$, and a reverse-extrapolated video with frames $F'''_{1.1}$-$F'''_{1.9}$ based on $F_2$. Notably, the forward-extrapolated frames do not use data from $F_2$ and the reverse-extrapolated frames do not use data from $F_1$. In other words, the data from only one low-speed frame, the motion vector(s), and corresponding offset are used to generate the extrapolated frames.

The motion vectors and/or offsets may be applied to a frame by transforming the frame (in whole or part) according to one or more of: rotations, vertical flips, horizontal flips, translations, warping (e.g., non-uniform scaling), and scaling. The series of extrapolated frames may be generated by applying a first motion vector (and, in some examples, a first offset) to a first low-speed frame (e.g., frame $F_1$) to generate a first extrapolated frame. Successive extrapolated frames may be generated by applying the next motion vector (and the offset) to the previously generated extrapolated frame (e.g., applying the second motion vector (and the first offset) to the first extrapolated frame to generate the second extrapolated frame). This successive generation of extrapolated frames may continue until (or just prior to) a generated version of the next corresponding frame (e.g., frame $F_2$) is generated. Thus, in some examples, the last (or first) generated motion vector would not be used to generate an extrapolated frame. Additional post-processing, such as tone mapping for HDR implementations, may be applied at this stage.

At step 418, the post-processing device 110 "morphs" (cross-fades) the two extrapolated videos across time to create an intermediate frames with the resolution of the output of low-speed camera 220 and the frame rate of the output of high-speed camera 200. More directly, the exemplary embodiment performs frame interpolation (from frame $F_1$ to $F_2$) by using a forward-extrapolated video segment (forward-extrapolated video with frames $F'_{1.1}$—$F'_{1.9}$ based on $F_1$) and a reverse-extrapolated video segment (reverse-extrapolated video with frames $F''_{1.1}$-$F''_{1.9}$ based on $F_2$).

The post-processing device 250 may repeat the process for the next corresponding frames (frames $F_2$, $F_{2.0}$ and $F_3$, $F_{3.0}$, etc.) In the illustrated flow, the process returns to step 410 to repeat synchronization. In other implementations where synchronization is unnecessary or undesirable, the process may return to step 412.

Figure 5:
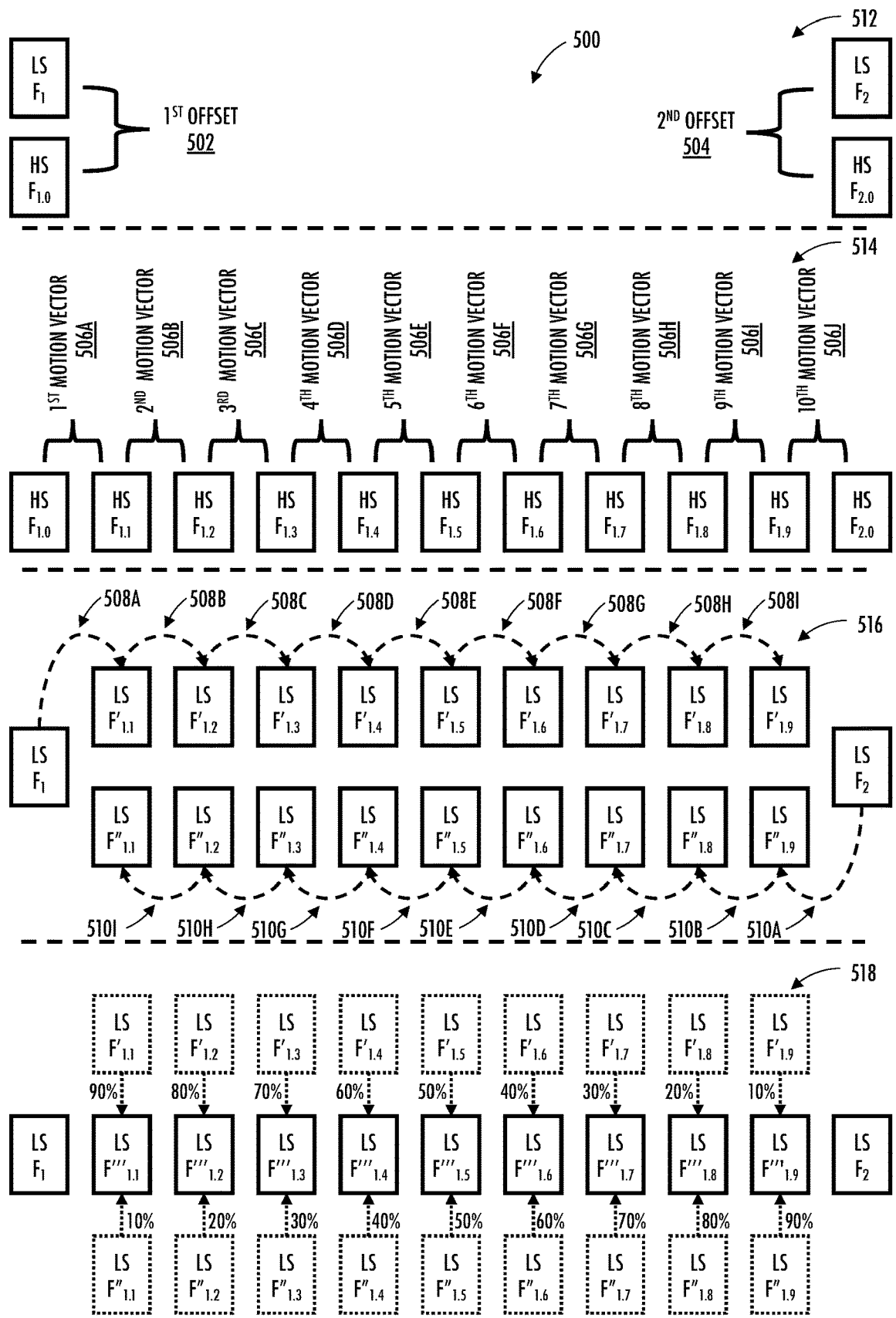
FIG. 5 is a graphical representation of the exemplary motion transfer process, according to aspects of the present disclosure.

FIG. 5 provides a graphical representation of the exemplary motion transfer process (described above in steps 410 to 418 of FIG. 4). At step 512, a first offset 502 is calculated by comparing corresponding frames—frame $F_1$ of the low-speed video captured by low-speed camera 220 and $F_{1.0}$ of the high-speed video captured by the high-speed camera 200. A second offset 504 is calculated by comparing corresponding frames—frame $F_2$ and $F_{2.0}$. An optical flow analysis can be performed on the corresponding frames of different cameras across space (rather than across time) to generate the spatial offsets.

At step 514, the post-processing device 250 determines the first motion vector(s) 506A between high-speed frame $F_{1.0}$ and $F_{1.1}$. This may be repeated for each of the corresponding high-speed frame pairs to generate motion vectors 506B, 506C, 506D, 506E, 506F, 506G, 506H, 506I, 506J. In some embodiments, motion vectors may be determined for a greater or smaller number of frames based on the number of intermediate high-speed frames (e.g., $F_{1.1}$-$F_{1.9}$) that were captured between corresponding low-speed and high-speed frames. For instance, motion vectors may "skip over" or disregard a number of high-speed captured frames (e.g., motion vectors may only be generated between $F_{1.2}$ and $F_{1.4}$, "skipping" $F_{1.3}$). This may be useful where fewer intermediate frames are desired (e.g., to reduce power consumption, shorten render time, etc.) In some cases, fewer intermediate frames are generated (e.g., only 5 instead of 10); in other cases, the intermediate frames may be duplicated (e.g., 5 pairs of intermediate frames (10 total), etc.)

At step 516 of FIG. 5, a series of forward-extrapolated frames may be generated by starting with a first low-speed frame $F_1$. To generate the forward-extrapolated frames $F'_{1.1}$-$F_{1.9}$, the post-processing device 250 may apply the first motion vector(s) 506A and the first offset 502 to low-speed frame $F_1$ generating the first forward-extrapolated frame $F'_{1.1}$, at step 508A. The post-processing device 250 may apply the second motion vector(s) 506B and the first offset 502 to the first forward-extrapolated frame $F'_{1.1}$ to generate the second forward-extrapolated frame $F'_{1.2}$, at step 508B. This process may be repeated for steps 508C, 508D, 508E, 508F, 508G, 508H, 508I to create $F'_{1.3}$, $F'_{1.4}$, $F'_{1.5}$, $F'_{1.6}$, $F'_{1.7}$, $F'_{1.8}$, $F'_{1.9}$. In the illustrated example, a forward-extrapolated equivalent of $F_2$ ($F'_{1.10}$) is not generated, however the post-processing device 250 could do so by applying the tenth motion vector(s) 506J and the first offset 502 to $F'_{1.9}$.

Similarly, a series of reverse-extrapolated frames may also be generated by starting with a second low-speed frame $F_2$. To generate the reverse-extrapolated frames $F''_{1.1}$-$F''_{1.9}$, the post-processing device 110 may apply the tenth motion vector(s) 506J and the second offset 504 to low-speed frame $F_2$ generating the first reverse-extrapolated frame $F''_{1.9}$, at step 510A. The post-processing device 250 may apply the ninth motion vector(s) 506I and the second offset 504 to the first reverse-extrapolated frame $F''_{1.9}$ to generate the second reverse-extrapolated frame $F''_{1.8}$, at step 510B. This process may be repeated for steps 510C, 510D, 510E, 510F, 510G, 510H, 510I to create $F''_{1.7}$, $F''_{1.6}$, $F''_{1.5}$, $F''_{1.4}$, $F''_{1.3}$, $F''_{1.2}$, $F''_{1.1}$. In the illustrated example, a reverse-extrapolated equivalent of $F_1$ ($F''_{1.0}$) is not generated, however the post-processing device 250 could do so by applying the first motion vector(s) 506A and the second offset 504 to $F''_{1.1}$.

At step 518 of FIG. 5, the post-processing device 250 may blend the forward-extrapolated video (frames $F'_{1.1}$-$F'_{1.9}$) with the reverse-extrapolated video (frames $F''_{1.1}$-$F''_{1.9}$). In the illustrated embodiment, the forward-extrapolated video and the reverse-extrapolated video are cross-faded (also known as a cross-dissolved) to create a cross-faded interpolated video. Specifically, each forward-extrapolated frame is blended with its reverse-extrapolated counterpart frame (i.e., $F'_{1.1}$ and $F''_{1.1}$, $F'_{1.2}$ and $F''_{1.2}$, ..., $F'_{1.9}$ and $F''_{1.9}$).

In one exemplary embodiment, the blend linearly changes the relative opacity of each frame. As forward-extrapolated frames are temporally distanced from frame $F_1$, the opacity of the forward-extrapolated frame decreases (and transparency increases). As reverse-extrapolated frames are temporally distanced from frame $F_2$, the opacity of the reverse-extrapolated frame decreases (and transparency increases). For example, forward-extrapolated frame $F'_{1.1}$ is blended at 90% opacity with reverse-extrapolated frame $F''_{1.1}$ at 10% opacity to generate low-speed interpolated frame $F'''_{1.1}$. A similar process is used for each of $F'''_{1.2}$-$F'''_{1.9}$.

As a brief aside, the "opacity" of a frame refers to the weight of the frame's contribution to the final blend. In some embodiments, frames are alpha-blended (i.e., a linear interpolation) at the indicated opacity. For example, a pixel value at a location (x, y) of forward-extrapolated frame $F'_{1.1}$ is multiplied by a first opacity (e.g., 0.9), and added to the pixel value at the corresponding location of reverse-extrapolated frame $F''_{1.1}$ multiplied by the second opacity (e.g., 0.1). In some variants, pixel components (e.g., red, green, and blue/YUV/YCbCr components) may be blended separately and later combined. Gamma and/or color correction may be performed on the blended pixels to correct for differences in perception of various colors and brightness. In an alternative embodiment, each pixel is selected (pseudo)-randomly from one of the two frames (the forward-extrapolated frame or the reverse-extrapolated frame) with a probability based on the opacity. For example, a pixel in the blended frame may be selected from frame $F'_{1.1}$ with a 90% probability and frame $F''_{1.1}$ with a 10% probability.

The illustrated cross-fade is a linear cross-fade, where opacity values rise and fall in a linear fashion (e.g., a 10% increase/decrease between interpolated frames). Other types of cross-fades "shapes" may also be used. Different cross-fade shapes change the rate at which the frame interpolation weights the forward-extrapolated frames relative to the reverse-extrapolated frames. Exemplary fade shapes include linear, logarithmic, exponential and S-curve.

In one exemplary use case, the (high-resolution) low-speed interpolated frames $F'''_{1.1}$-$F'''_{1.9}$ may be stacked to produce slow motion effects (e.g., cinematic-style motion blur). For example, stabilization may be performed in post-processing and then motion blur applied by stacking successive frames to achieve a desired virtual-shutter angle in post-processing. Stacking high-speed frames to achieve a selected shutter angle effect in post-processing are more broadly described within co-owned U.S. patent application Ser. No. 17/647,581 entitled "SYSTEMS, APPARATUS, AND METHODS FOR STABILIZATION AND BLENDING OF EXPOSURES" filed Jan. 10, 2022, incorporated herein by reference in its entirety.

The foregoing techniques may also be used alongside other techniques to perform stabilization using a stereo-camera setup. Further post-processing techniques using the stereo-camera setup may generate depth maps from the multiple sets of pixel data. Parallax effect correction and artifact removal (e.g., lens flares) may also be performed using the two sets of video (high-speed video and low-speed video).

Additionally, the foregoing techniques may be used to improve structure from motion (also known as "SfM") solving. Structure from motion is a photogrammetric range imaging technique for estimating three-dimensional structures from two-dimensional image sequences that may be coupled with local motion signals. A feature may be tracked using the high-speed data; feature tracking may be applied to the low-speed frame to improve the accuracy of movement tracking/feature tracking between frames. This may allow for more realistic augmented reality effects to be implemented. For example, computer generated (CG) objects may be added to the captured scene. Similarly, the frame can be moved to create the impression that the camera is "walking" like a person. The foregoing techniques may also aid in 3D reconstruction and reality mapping.

Exemplary Methods and Apparatus

Figure 6:
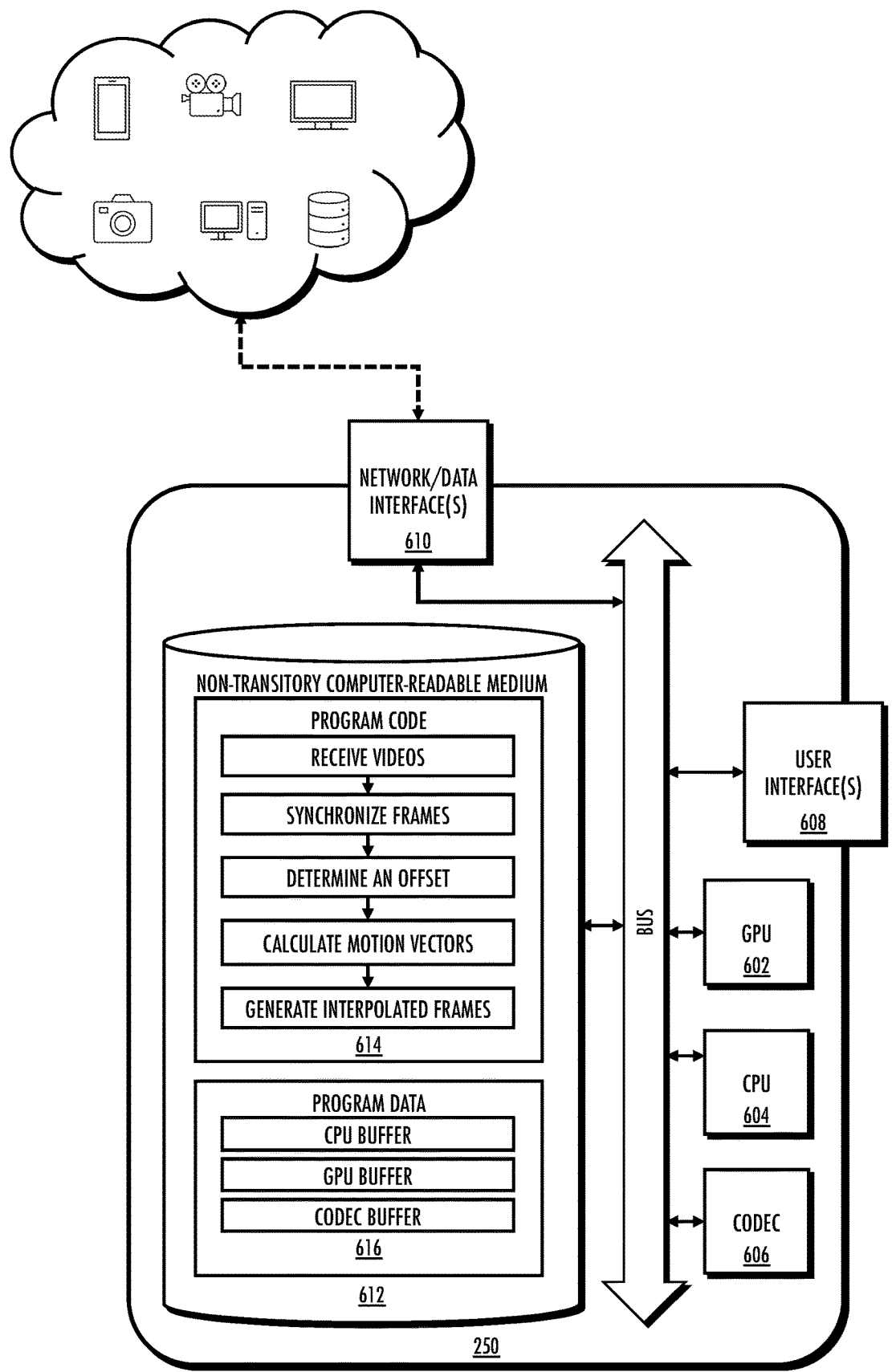
FIG. 6 is a logical block diagram of a post-processing device, useful to illustrate various aspects of the present disclosure.

FIG. 6 is a logical block diagram of a post-processing device 250, useful to illustrate various aspects of the present disclosure. The post-processing device 250 includes a processor subsystem, a memory subsystem, a user interface subsystem, a network/data interface subsystem, and a bus to connect them. During exemplary operation, the post-processing device 250 obtains high-speed video (captured by a high-speed camera 200) and low-speed video (captured by low-speed camera 220). In some variants, post-processing device 250 may use motion data from the high-speed video 200 to interpolate frames of (high-resolution) low-speed video. In one exemplary embodiment, the post-processing device 250 may be a server that can perform post-processing of video footage. Other embodiments of source devices may include without limitation: a smartphone, an action camera, a tablet, a laptop, a television, a workstation, and/or any other device that can perform post-processing.

In one embodiment, the processor subsystem may read instructions from the memory subsystem and execute them within one or more processors. The illustrated processor subsystem includes: a graphics processing unit (GPU 602), a central processing unit (CPU 604), and a codec 606. Other processor subsystem implementations may multiply, combine, further subdivide, augment, and/or subsume the foregoing functionalities within these or other processing elements. For example, multiple GPUs may be used to perform high complexity image operations in parallel. Similarly, codec functionality may be subsumed with either GPU or CPU operation via software emulation.

In one embodiment, the user interface subsystem may be used to present media to, and/or receive input from, a human user. The user interface subsystem may include physical components (e.g., buttons, keyboards, switches, scroll wheels, etc.) or virtualized components (via a touchscreen). In one exemplary embodiment, the user interface subsystem 608 may include an assortment of a display, touchscreen, physical buttons, speaker(s), and a microphone.

In one embodiment, the network/data interface subsystem may be used to receive data from, and/or transmit data to, other devices. The network/data interface subsystem may include: wired interfaces, wireless interfaces, and/or removable memory media. In one exemplary embodiment, the network/data interface subsystem 610 may include network interfaces including, but not limited to: Wi-Fi, Bluetooth, Global Positioning System (GPS), USB, and/or Ethernet network interfaces. Additionally, the network/data interface subsystem 610 may include removable media interfaces such as: non-volatile memory cards (such as MMC, SD, mini-SD, and micro-SD cards), Flash drives, hard drives, and/or any other optical/electrical/magnetic media (e.g., MMC cards, CDs, DVDs, tape, etc.)

In one embodiment, the network/data interface subsystem 610 may receive videos from multiple cameras. In one exemplary embodiment, the network/data interface subsystem 610 may receive high-speed video captured/generated by a high-speed camera and low-speed video captured/generated by a low-speed camera. In some embodiments, the videos may be stored in the same video file (e.g., as separate tracks) whereas in other embodiments, the videos may be stored in separate video files (e.g., accessible on different storage devices).

In one embodiment, the memory subsystem may be used to store (write) data locally at the post-processing device 110. In one exemplary embodiment, data may be stored as non-transitory symbols (e.g., bits read from non-transitory computer-readable mediums.) In one specific implementation, the memory subsystem 612 is physically realized as one or more physical memory chips (e.g., NAND/NOR flash) that are logically separated into memory data structures. The memory subsystem may be bifurcated into program code 614 and/or program data 616. In some variants, program code and/or program data may be further organized for dedicated and/or collaborative use. For example, a multicore GPU and/or CPU system may allocate dedicated memory buffers to facilitate parallelized operation. Similarly, the codec 606 may have a dedicated memory buffer to avoid resource contention.

In one embodiment, the program code includes non-transitory instructions that when executed by the processor subsystem cause the processor subsystem to perform tasks which may include: calculations, and/or actuation of the user interface subsystem and/or network/data interface subsystem. In some embodiments, the program code may be statically stored within the post-processing device 110 as firmware. In other embodiments, the program code may be dynamically stored (and changeable) via software updates. In some such variants, software may be subsequently updated by external parties and/or the user, based on various access permissions and procedures.

In one embodiment, the tasks are configured to synchronize frames of the received video. In some cases, the frames are pre-synchronized. In other cases, frames of video are synchronized based on visual data within the video (e.g., via optical flow and minimizing the magnitude of motion vectors) or other data (telemetry, audio), or manual synchronization. More generally however, any scheme for synchronizing frames may be substituted with equal success.

In one embodiment, the tasks are configured to calculate an offset between (synchronized) frames. The offset may be determined via an optical (pixel) flow between synchronized frames of high-speed video and low-speed video.

In one embodiment, the tasks are configured to calculate sets of motion vectors between frames of high-speed video. The motion vectors may provide a mapping from pixels in one frame of the high-speed video to the next frame of the high-speed video. In some embodiments, the sets of motion vectors may be calculated via optical flow.

In one embodiment, the tasks are configured to generate interpolated frames. The interpolated frames may be generated from multiple extrapolated frames based on the determined offset and the calculated motion vectors. In some embodiments, the tasks are configured to generated two sets of extrapolated frames—forward-extrapolated frames and reverse-extrapolated frames. In further embodiments, the two generated sets of extrapolated frames are combined to create blended interpolated frames. The sets of interpolated frames may be combined via blending/interpolating corresponding frames of the two generated sets. The blending may be part of cross-fading the sets of forward-extrapolated frames and reverse-extrapolated frames.

In one exemplary embodiment, the processor subsystem may include dedicated logic or hardware accelerators for optical flow analysis. For example, optical flow analysis may be implemented as hardware logic within existing video codec logic. More generally, optical flow acceleration determines the motion of pixels between frames (e.g., frame $F_{1.0}$ and frame $F_{1.1}$, etc.) and generate motion vectors for each moved pixel or group of pixels. In one specific implementation, the logic may match movement of pixels within successive video frame(s) or group of frames (motion vectors). In one specific implementation, the logic may determine the difference between two frames (spatial offset) associated with different video segments In some implementations, the processor subsystem may include software for optical flow analysis. Software-based optical flow analysis may be particularly useful for tasks of arbitrary/conditional complexity. Examples of such image analysis include e.g., non-linear image comparisons (differences in vantage and/or exposure). For example, the optical element of the high-speed camera may include a wide-angle lens, which may provide a fisheye view of the visual content. The optical flow obtained from the fisheye view of the visual content may be run through the lens model and/or other models (e.g., rolling shutter model) to project the optical flow in a rectilinear view corresponding to a DSLR type camera. The vectors of the optical flow in the rectilinear view may be compared with the same/a similar view of the low-speed camera.

As a brief aside, motion vectors may represent motion (or displacement) of one or more pixel data captured within individual video frames. Typically, motion vectors define motion as distances in 2 dimensions (e.g., an x component and y component of motion). Motion vectors may also be characterized by direction(s) of motion (linear and/or angular) and magnitude(s) of motion. More complex representations of motion may also be substituted with equal success (e.g., light fields in three dimensions, quaternions in four dimensions, etc.)

There are two sources of pixel motion over time: subject motion and apparent motion (induced by device motion relative to the subject). The post-processing device 250 may assess motion within an entire video frame (e.g., combination of motion vectors associated with portions of the video frame) or motion within particular portion(s) of the video frame. For example, video frames of video content may be divided into multiple portions (e.g., macro blocks) and motion vectors of individual portions may be determined. Motion vectors of the individual portions may be combined (e.g., summed, square summed, averaged) to determine the motion for the entire video frame. Individual video frames of the video content may be associated with global motion (e.g., motion of the frame as a whole) and/or local motion (motion of a portion of the frame).

In some embodiments, the post-processing device 250 may assess motion within video content based on video compression and/or other information. In one such implementation, video compression represents video as intra-frames (I-frames), predicted frames (P-frames), and bi-directional frames (B-frames). P- and B-frames may include information regarding changes in the video frames from prior frames, subsequent frames, or both. This compression information may be used to characterize/define the motion of the video content. The post-processing device 250 may use such information to assess the motion of the video content or between videos captured by different devices.

As previously noted, apparent motion can be induced by motion/operation of image sensor(s) that captured the video content. As non-limiting examples, apparent motion may include one or more of zoom, pan, tilt, dolly, truck, pedestal, and/or other capture of the video content by the image sensor(s). In some implementation, motion of the capture device may be assessed based on movement sensors (e.g., accelerometer, gyroscope) to counteract apparent motion. In some implementations, capture information may include a direction of gravity on the image sensor(s) during the capture of the video content. The direction of gravity may indicate the positioning of the image sensor(s) with respect to gravity during capture of the video content (e.g., upright, tilted, flipped).

While spatial offsets between camera vantages are not "physical" pixel motion, the same motion estimation logic and algorithms may be used to assess the spatial offset difference. In other words, spatial offsets between piggy-backed cameras may be treated as "motion-like" information. Motion-like information may be determined between frames captured at or near the same time from a different camera/lens. Motion-like information may be determined using one or more of block-matching algorithm, phase correlation and frequency domain methods, pixel recursive algorithms, optical flow, feature detection, and/or other criteria matching methods.

Technological Improvements and Other Considerations

The above-described system and method solves a technological problem in industry practice related to frame interpolation of video. The various solutions described herein directly address a problem that is created by limitations of the capture mechanisms of cameras. Specifically, the capture rate necessary to sample subject motion for frame interpolation may be much different than the desired shutter angle (related to shutter speed). Various aspects of the present disclosure resolve this by using multiple cameras to capture the same scene at different capture speeds. The resulting footage is then interpolated using the desirable aspects of both capture speeds.

As a related consideration, existing techniques for frame interpolation of non-linear motion is computationally complex. For example, previous solutions rely on neural network processing and esoteric capture apparatus (e.g., event cameras). In many cases, these components are unsuitable for embedded device operation due to e.g., higher processing power, memory requirements, etc. The various solutions described herein enable frame interpolation within commodity components that are already widely available in embedded devices. In other words, the techniques described herein represent an improvement to the field of embedded computing environments.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:
1. A method of generating interpolated video, comprising:
obtaining a first frame of a first video and a corresponding frame of a second video;
determining a first set of motion vectors from the first frame of the first video to a second frame of the first video and a second set of motion vectors from the second frame to a third frame of the first video;

applying the first set of motion vectors to the corresponding frame generating a first extrapolated frame; and applying the second set of motion vectors to the first extrapolated frame generating a second extrapolated frame.

2. The method of claim 1, further comprising:

performing an optical flow on the first frame and the corresponding frame to determine an offset.

3. The method of claim 2, wherein generating the first extrapolated frame further comprises applying the offset to the corresponding frame.

4. The method of claim 3, wherein generating the second extrapolated frame further comprises applying the offset to the first extrapolated frame.

5. The method of claim 1, wherein the first video is characterized by a first frame rate and the second video is characterized by a second frame rate, the first frame rate greater than the second frame rate, the method further comprising:

generating the interpolated video based on the second video and the first extrapolated frame and the second extrapolated frame, the interpolated video characterized by a frame rate equivalent to the first frame rate.

6. The method of claim 5, wherein:

the first video is characterized by a first resolution and the second video is characterized by a second resolution, the second resolution greater than the first resolution, and the interpolated video is characterized by the second resolution.

7. An apparatus, comprising:

a processor; and a non-transitory computer-readable medium comprising instructions which, when executed by the processor, causes the apparatus to:

obtain a first frame of a first video, a second frame of the first video, a third frame of a second video, a fourth frame of the second video and a plurality of intervening frames of the second video where the first frame and the third frame are characterized by a first capture time and the second frame and the fourth frame are characterized by a second capture time, the plurality of intervening frames of the second video having a capture time between the first capture time and the second capture time;

generate sets of motion vectors between successive frames of the second video;

generating a first forward-extrapolated frame and applying a first subset of the sets of motion vectors to generate additional forward-extrapolated frames; and generate a first reverse-extrapolated frame and applying a second subset of the sets of motion vectors to the first reverse-extrapolated frame to generate additional reverse-extrapolated frames.

8. The apparatus of claim 7, where the instructions when executed by the processor, further causes the apparatus to blend the first forward-extrapolated frame and the additional forward-extrapolated frames with the first reverse-extrapolated frame and the additional reverse-extrapolated frames to generate blended interpolated frames.

9. The apparatus of claim 8, where blending comprises a linear cross-fade.

10. The apparatus of claim 7, where the instructions when executed by the processor, further causes the apparatus to determine a first spatial offset between first pixels of the first frame and second pixels of the third frame.

11. The apparatus of claim 10, where the instructions when executed by the processor, further causes the apparatus to determine a second spatial offset between third pixels of the second frame and fourth pixels of the fourth frame.

12. The apparatus of claim 11, where the first forward-extrapolated frame is based on applying the first spatial offset to the first frame.

13. The apparatus of claim 12, where the first reverse-extrapolated frame is based on applying the second spatial offset to the second frame.

14. The apparatus of claim 7, where generating the sets of motion vectors comprises applying optical flow between the successive frames of the second video.

15. The apparatus of claim 7, where the instructions when executed by the processor, further causes the apparatus to synchronize the first frame of the first video and the third frame of the second video.

16. A non-transitory computer-readable medium comprising instructions which, when executed by a processor subsystem, causes a device to:

receive a first video captured by a first camera and a second video captured by a second camera;

synchronize frames of the first video and the second video;

determine a spatial offset between a first synchronized frame of the first video and a second synchronized frame of the second video;

calculate motion vectors between successive frames of the first video; and generate extrapolated frames based on the second synchronized frame, the spatial offset, and the motion vectors.

17. The non-transitory computer-readable medium of claim 16, where the extrapolated frames comprise forward-extrapolated frames based on the spatial offset and the motion vectors, and the instructions, when executed by the processor subsystem, further causes the device to generate reverse-extrapolated frames based on the motion vectors and a second spatial offset between a third synchronized frame of the first video and a fourth synchronized frame of the second video.

18. The non-transitory computer-readable medium of claim 17, where the instructions, when executed by the processor subsystem, further causes the device to cross-fade the forward-extrapolated frames and the reverse-extrapolated frames to generate interpolated frames.

19. The non-transitory computer-readable medium of claim 18, where the first video captured by the first camera at a first frame rate is characterized by a first resolution, the second video captured by the second camera at a second frame rate is characterized by a second resolution, the first frame rate greater than the second frame rate and the second resolution greater than the first resolution, wherein the interpolated frames are characterized by the second resolution and the first frame rate.

20. The non-transitory computer-readable medium of claim 16, where the spatial offset represents a parallax difference between the first synchronized frame of the first video and the second synchronized frame of the second video.

* * * * *